United States Patent

[11] 3,580,539

| [72] | Inventor | Davis A. Van Scoy<br>Houston, Tex. |
|---|---|---|
| [21] | Appl. No. | 697,979 |
| [22] | Filed | Jan. 15, 1968 |
| [45] | Patented | May 25, 1971 |
| [73] | Assignee | Helmerich & Payne, Inc.<br>Houston, Tex. |

[54] VALVE SEAL AND SYSTEM
14 Claims, 8 Drawing Figs.

[52] U.S. Cl. .................................................. 251/159,
251/172, 137/268
[51] Int. Cl. .................................................... F16k 25/00
[50] Field of Search........................................ 137/268,
174; 15/104.06 (A); 251/159; 137/599, 315,
625.43, 637.5, 242, 268, 174; 15/104.06 (A);
251/175, 172, 174, 160, 161, 315, 192, 185, 182,
314, 359, 364, 360, 362, 363

[56] References Cited
UNITED STATES PATENTS

| 3,463,448 | 8/1969 | Piccardo | 251/159 |
|---|---|---|---|
| 3,315,697 | 4/1967 | Oliver | 251/313X |
| 3,379,410 | 4/1968 | Stewart, Jr. I | 251/359 |
| 3,421,733 | 1/1969 | Stewart, Jr. II | 251/363X |
| 3,288,163 | 11/1966 | Craven | 15/104.06A |
| 3,007,490 | 11/1961 | Passmore | 137/599 |
| 3,173,647 | 3/1965 | Bryant | 251/174X |
| 3,184,212 | 5/1965 | Billeter | 137/315X |
| 3,186,426 | 6/1965 | Brown et al. | 137/637.5X |
| 3,219,055 | 11/1965 | Dumm | 137/315 |
| 3,220,432 | 11/1965 | Allen | 137/268 |
| 3,283,354 | 11/1966 | Simmons | 137/268X |
| 3,397,570 | 8/1968 | Pfrehm | 73/3 |

Primary Examiner—M. Cary Nelson
Assistant Examiner—Robert J. Miller
Attorneys—Bill B. Berryhill, Murray Robinson, Ned L. Conley, James A. Bargfrede and Robert W. B. Dickerson ABSTRACT: A hydraulically retractable valve seal comprising a sleeve seat member mounted for limited sliding movement in a counterbored flow passage of a valve. The seat member is biased toward the closure member of the valve by springs mounted between an outwardly flaring flange portion of the seat member and the valve body. A resilient sealing member is mounted on the inner face of the seat member for sealing contact with the valve closure member. An annular chamber is formed between the counterbore of the valve body and the cylindrical exterior of the seat member. This chamber is sealed at one end by a stationary ring seal connected to the valve body and at the other end by a ring seal connected to the seat member flange for sliding contact with the counterbore. The annular chamber is connected to a pressure source for selectively overcoming the spring bias to retract the seat member and consequently the sealing member from sealing contact with the valve closure member.

Also, a system employing a valve equipped with the seal described comprising an electrical power source for energizing relay and time delay devices to first activate a pump for retracting the seal then second activate an operator for rotating the valve closure member only after the seal is completely disengaged therefrom. A limit switch attached to the operator deenergizes the electrical circuits, after complete rotation of the closure member, to stop the pump and relieve pressure from the annular chamber of the valve seal. The seal once again engages the closure member under spring bias.

Patented May 25, 1971

Davis A. Van Scoy
INVENTOR.

BY
Bill B. Berryhill
ATTORNEY

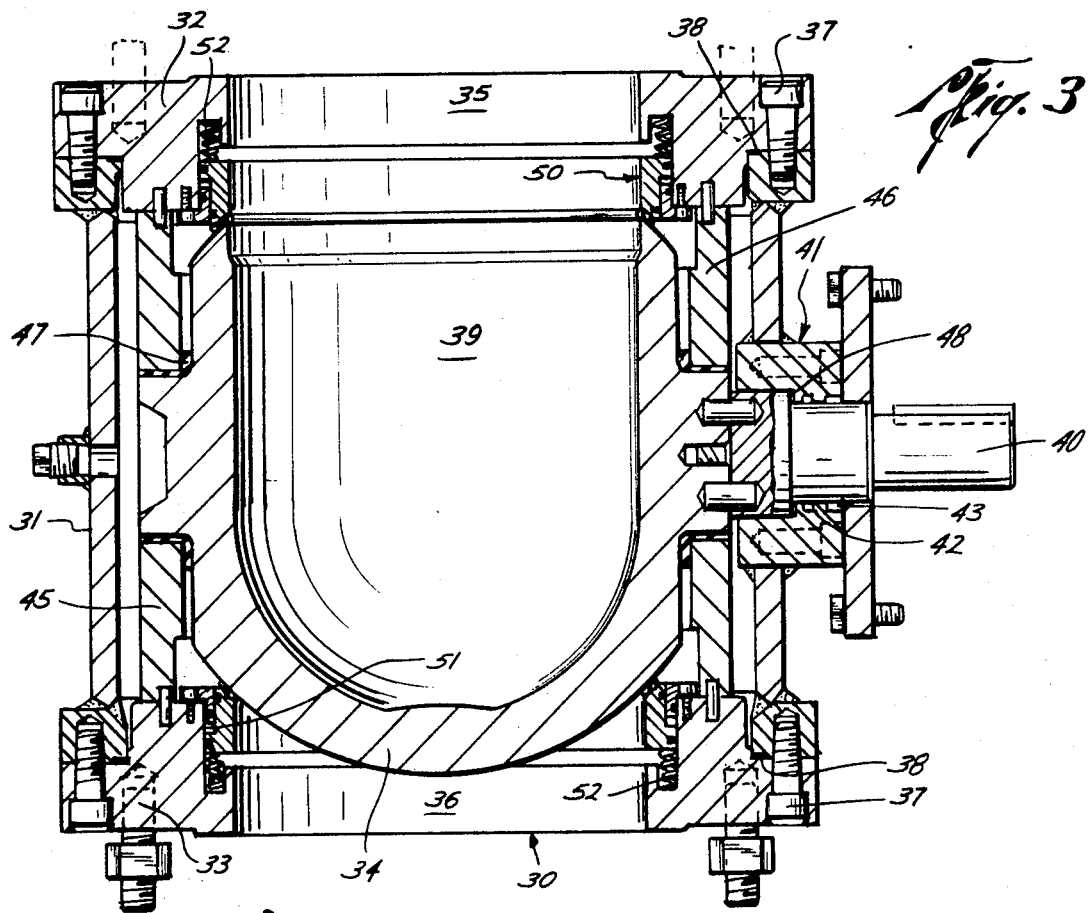
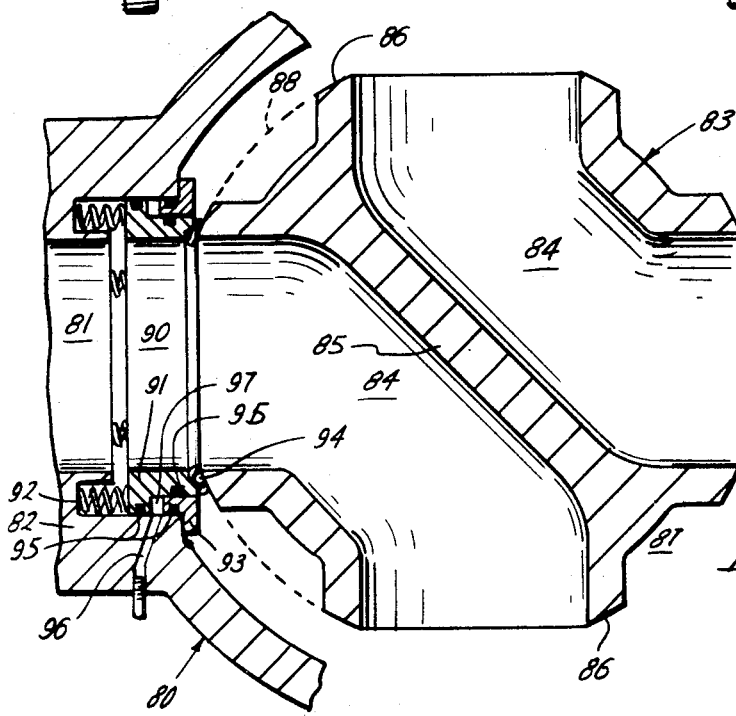

Patented May 25, 1971
3,580,539
3 Sheets-Sheet 3
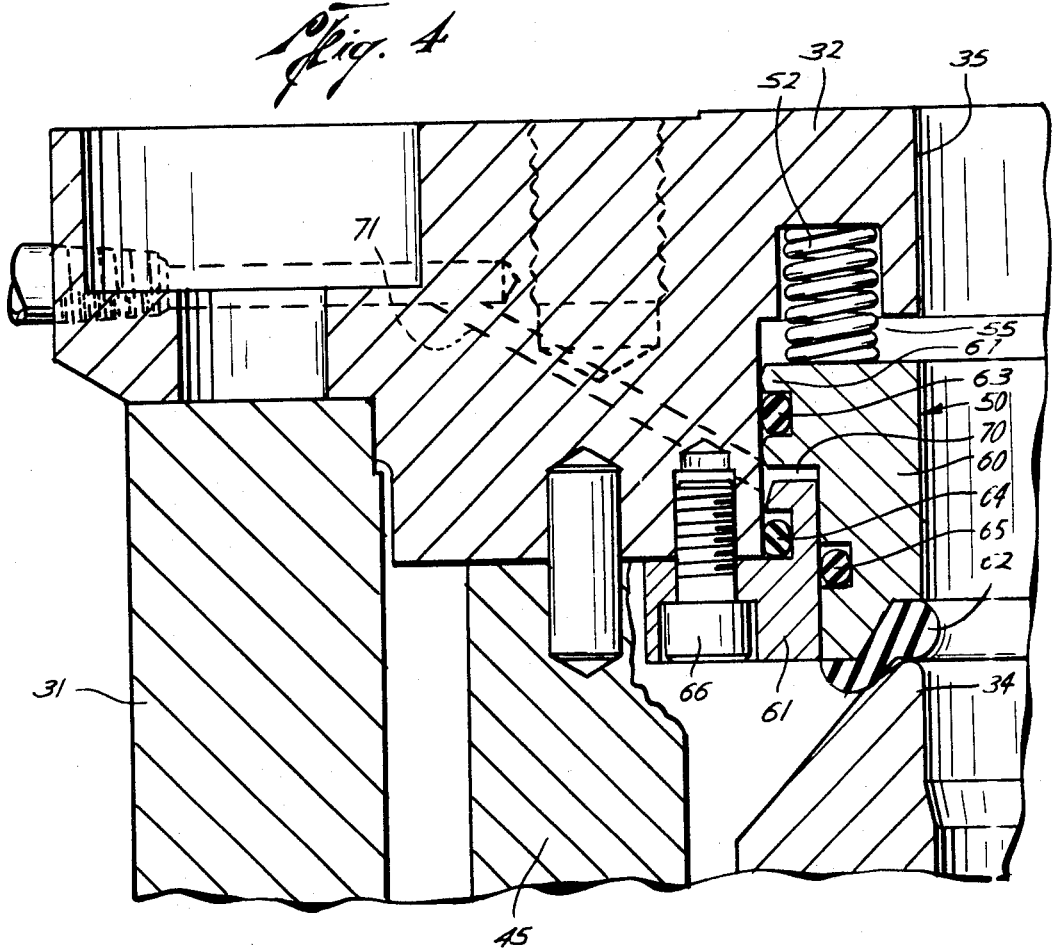
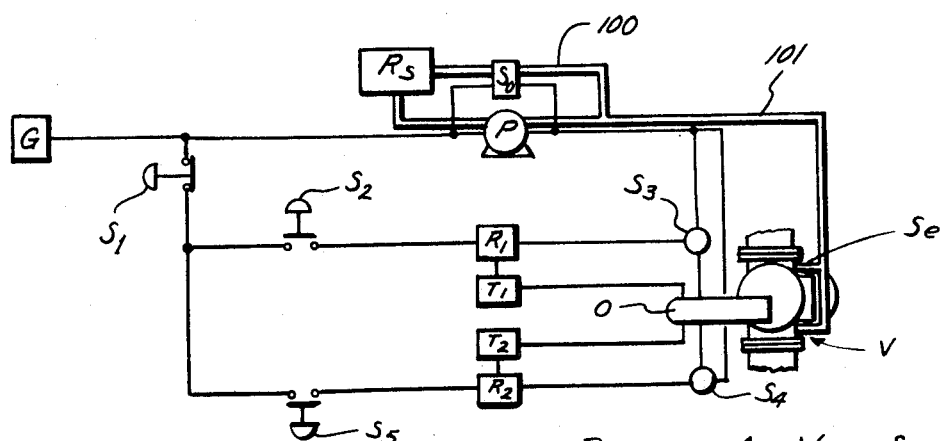
Davis A. Van Scoy
INVENTOR.
BY
Bill B Berryhill
ATTORNEY

VALVE SEAL AND SYSTEM

BACKGROUND OF THE INVENTION

1. Field of the Invention

This invention is related to valve seals. In particular, it is related to seals used with sphere-handling valves of mechanical displacement meter prover systems or the like.

2. Description of the Prior Art

Mechanical displacement meter provers, developments of recent years, have many advantages over the other types of meter proving. The proving is carried out under actual flow conditions and lends itself to automatic operation, which eliminates many sources of errors.

Some of the most widely used meter provers employ a sphere for displacing fluids in a U-shaped section of pipe. The sphere is forced around the pipe loop actuating a detector at the beginning and the end of its journey. The amount of fluid displaced by the sphere in its journey can be accurately calculated and compared against the meter to be proved which is in series with the prover system.

There are basically two types of looped provers: the unidirectional and the bidirectional. In the unidirectional prover, the sphere is caught at the end of its loop path and routed to a sphere-catching valve. The valve is connected to the beginning portion of the loop so that it may be rotated, allowing the sphere to reenter the loop for another run.

For accurate meter calibration, it is necessary to frequently prove a meter, each proving requiring a number of runs through the loop. Since the sphere catching valve is necessarily rotated frequently its seals are subjected to an extraordinary amount of wear which in the past has required frequent replacement. These valves, in the past, have also required a relatively large torque to rotate, due partially to the seal design.

To reduce seal wear and valve rotational torque, a retractable seal would be desirable. There are, of course, some retractable seal designs in the valve art. Two of these designs are described in the following U.S. Pats.:

U.S. Pat. No. 3,007,490–Passmore;
U.S. Pat. No. 3,186,426–Brown et al.

However, the applicant is unaware of such a seal or system suitable for use with a meter prover sphere-handling valve.

For such a use, a highly efficient seal is required since leakage will cause erroneous meter calibration. This requires a good low differential pressure seal since, during normal operations, the pressure on both sides of the valve are substantially the same. However, a portion of the valve is occasionally opened to load or unload sphere displacers. Therefore, a seal with good high differential pressure characteristics is also required. It is desirable to retract the seal before valve rotation and reengage the seal after rotation. During loading or unloading of spheres a man is exposed to a portion of the valve body interior. It is therefore important that the seal also be failsafe in operation.

Thus, it is obvious that the valve seal is an important component of the prover system. It must be highly efficient under both conditions of high and low pressure differential and it should incorporate failsafe operation features. It should be retractable before movement of the valve flow control element and reengageable after movement. Although some of the prior art may provide some of these characteristics, the applicant is unaware of a sealing system which incorporates all of these features in a combination suitable for meter prover use.

SUMMARY OF THE INVENTION

The present invention discloses an extremely efficient valve seal which may be slidably retracted from sealing engagement with the valve closure element before rotation, resulting in almost no seal wear and an extremely long seal life. Cutting of seats and closure member is eliminated and the valve is made self-flushing. The seal is spring biased into sealing engagement with the closure member. However, an annular chamber, between the valve body and the sliding seat member, allows the seal to be retracted when pressure is supplied to the chamber. The torque required to rotate the valve is then greatly reduced. After rotation of the valve, pressure may be relieved allowing the seal to once again sealingly engage the closure member. Since the seal is spring biased into engagement failure of the hydraulic system will cause the valve to failsafe.

An automatic system is also disclosed herein, in which electric relay and timing devices automatically retract the seal and then allow the valve to rotate only after the seal has been retracted. After rotation, the seal automatically reengages the closure member in sealing contact.

BRIEF DESCRIPTION OF THE DRAWINGS

FIG. 3 is an elevational view in section showing one embodiment of the invention as used with a sphere-handling valve;

FIG. 4 is a sectional detail of one embodiment of the invention;

FIG. 5 is a plan view in section of another embodiment of the invention for use in a fluid diverting valve, and;

FIG. 6 is a schematic representation of an automatic meter proving seal system for one embodiment of the invention.

DESCRIPTION OF THE PREFERRED EMBODIMENTS

Figure 1:
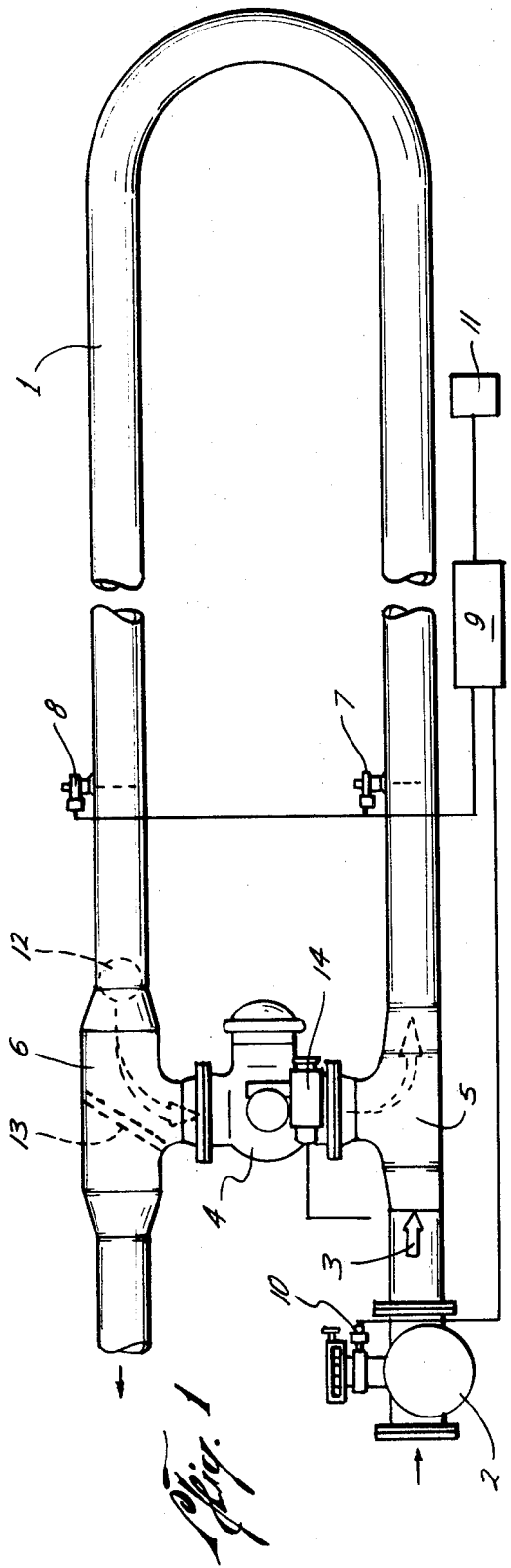
FIG. 1 is a somewhat schematic representation of a unidirectional meter proving system with which the invention may be employed.

Referring first to FIG. 1, a unidirectional meter proving system, with which the invention may be employed, will be described. A section of looped pipe 1 is connected in series with a flow meter 2 to be proved, line flow being in the direction of arrow 3. A sphere-handling valve 4 is connected between launching tee assembly 5 and separator tee assembly 6. Proximity sphere detector switches 7 and 8 are connected near tee assemblies 5 and 6 on loop 1. The switches are connected by a wire to an electronic meter proving counter 9 which is also electrically connected to a pulse generator 10 at meter 2. Counter 9 is also connected to an electrical power source 11.

For automatic operation with the unidirectional prover, a sphere 12 is used as a displacer. The sphere 12 is always forced in the same direction around loop 1 and is deflected by means such as separator bars 13 to a vertical position and caught by sphere-handling valve 4 to complete a cycle. To start a successive cycle, the valve 4 is actuated (usually by an operator 14) and the sphere drops down into the flowing stream and is again forced by line pressure through the loop to make another cycle.

As sphere 12 passes switch 7, it starts electronic counter 9 and as it passes switch 8 the counter is stopped. The counter counts the number of pulses transmitted by pulse generator 10 while the volume between switches 7 and 8 is displaced by sphere 12. When the run is completed a comparison exists between the meter measurement and the volume displaced in the prover. After a sufficient number of runs a factor may be determined which when applied to the meter reading will give an extremely accurate measurement of the volume passing through the meter 2.

Figure 2C:
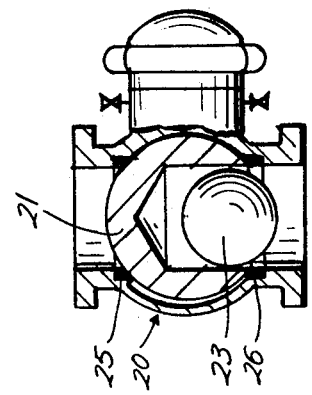
FIG. 2 (a), 2(b) and 2(c) are elevational views, partially in section, of a sphere-handling valve for use in the meter prover system of FIG. 1 shown in receive, load-unload, and launch positions respectively.
Figure 2B:
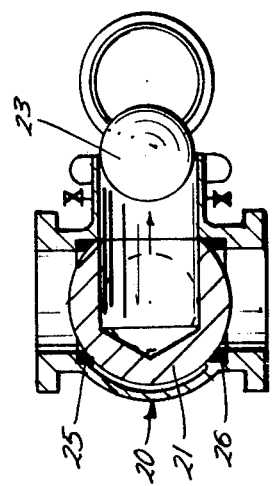
Figure 2A:
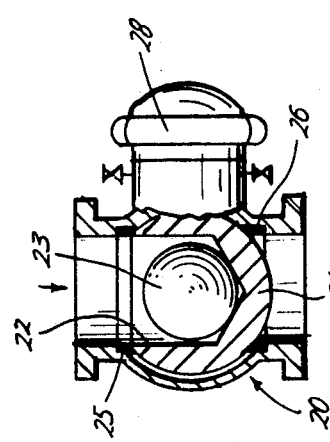

FIGS. 2(a), 2(b) and 2(c) are sectional views of one type of sphere-handling valve 20 in its receive, load-unload, and launch positions, respectively. The valve includes a rotating ball closure member 21 with a pocket 22 which in receive position catches and holds sphere 23 at the end of a loop cycle. Annular seals 25 and 26 assure that there is no leakage through the valve.

An enclosed chamber 28, is provided which, when ball member 21 is rotated 90° as shown in FIG. 2(b), may be opened to unload or load sphere 23. Seals 25 and 26, maintain a seal between line pressure and atmospheric pressure in the opened chamber 28.

If, however, it is not desired to load or unload sphere 23, ball member 21 may be rotated 180°, as shown in FIG. 2(c), to launch sphere 23 for another successive meter proving run.

Referring now to FIG. 3, a sphere-handling valve 30, similar to valve 20 of FIGS. 2(a), 2(b) and 2(c), embodying one form of the invention as shown in more detail. The valve comprises a generally cylindrical body 31, upper and lower flange members 32 and 33, and ball member 34. Flanges 32, 33 are provided with flow ports 35, 36 and are connected to body 31 by cap screws 37, annular O-rings 38 sealing therebetween.

Ball member 34 is provided with a pocket 39 and mounted within body 31 for rotation about a horizontal axis as shown in FIG. 3. Stem 40 affixed to ball 34 projects through body 31, a portion thereof being surrounded by gland housing 41, seal 42, and gland bushing 43. Bearing support includes bearing plates 45, 46 and thrust washers 47, 48.

Surrounding flow ports 35 and 36 are retractable sealing units 50 and 51 to be more fully described hereafter. The seal units 50, 51 are biased into sealing contact with the spherical surface of ball 34 by springs 52. Suffice it to say at the present time, that the present invention permits retraction of seal units 50, 51 before rotation of ball member 34 to any of the positions shown in FIGS. 2(a), 2(b) and 2(c) and subsequent reengagement with ball 34 after rotation. Thus frictional wear of seal units 50, 51 is almost, if not completely, eliminated and the rotating torque is greatly reduced. The valve is also self flushing. Any debris collected around the seal will be washed away when the seal is retracted.

Referring now to FIG. 4, a preferred embodiment of seal unit 50 will be described. The seal unit is generally received in a counterbored portion 55 of flow passage 35. The unit comprises sleeve seat member 60, annular body seal ring 61, a plurality of springs 52, primary seal 62, and pressure chamber seals 63, 64, 65.

Body seal ring 61 is stationarily affixed to flange 32 by capscrews 66. Seat member 60 is mounted for sliding longitudinal movement in counterbore 55 between an inward position (as shown), where seal 62 engages ball 34, and a retracted position, where seal 62 is completely out of contact with ball 34. Seat member 60 has an annular head extension 67 which is in sliding contact with counterbore 55. Counterbore 55, seat member 60, and body seal ring 61 define a variable annular pressure chamber 70 which is sealed against valve body and line pressures by O-rings 63, 64, 65. A conduit 71 through flange 32 provides pressure communication between chamber 70 and an external pressure source such as a pump, gas line pressure, etc. (not shown).

With little or no pressure in chamber 70 seal member 60 and seal 62 are urged against ball 34 by springs 52. Springs 52 are sufficiently strong to assure effective sealing. However, under normal circumstances, additional sealing force is applied due to the pressure differential between chamber 70 and flow port 35.

To retract seal 62 and seat member 60, pressure in a sufficient amount is supplied to chamber 70 through conduit 71. Seat member 60, acting as a hydraulic piston, depresses springs 52 and consequently seal 62 disengages ball 34. Ball 34 may then be rotated not only with no resulting seal wear but also with less operating force. In addition, any deleterious material accumulated at the seal will be flushed away by line flow. It can also be understood that should the pressure source fail, springs 52 will force seal 62 back into sealing engagement for failsafe operation.

Any number of configurations, O-rings, flat, etc., for seal 62 may be used. However, the particular configuration shown, two rounded surfaces confluently joined and confronting the mating rounded lip of ball 34, are believed to be a novel construction having particularly desirable sealing characteristics.

Not only is the retractable seal of the invention useful for all types of closure valves; i.e., ball, gate, plug, etc.; but, it is also obviously useful for other types such as the fluid diverting valve disclosed in U.S. Pat. No. 3,472,280 for use with bidirectional meter provers and the like. In such a valve, flow is never stopped but merely diverted through different conduits. It is still necessary, however, to maintain a good seal during sphere displacer runs.

FIG. 5 illustrates how the invention could be used with a fluid diverting valve which includes a body 80, four flow ports 81 at 90° intervals with associated flanges 82 and a rotating flow direction ball member 83. Ball member 83 is provided with two 90° turn passageways 84 separated by partition wall 85. When one passageway 84 is aligned with two valve ports 81 the other is aligned with two other valve ports 81. The ball 83 may be rotated to allow communication of any two adjacent valve ports 81. Ball 83 has spherical sealing surfaces 86 around passageways 84 and may either be relieved therebetween as at 87 or have a continuous spherical surface as shown at 88.

A seal unit 90 may be provided in each port 81. Operating similarly to seal Unit 50 as previously described with reference to FIG. 4, seal 90 comprises seat member 91, springs 92, body ring seal 93, primary seal 94 and O-rings 95. A conduit 96 provides pressure communication between an outside pressure source and annular chamber 97. Pressure applied to chamber 97 causes the retraction of seat 91 and seal 94 for friction reduced movement of ball 85 and reduced seal wear.

An automatic system has been devised for use with a meter prover and sphere-handling valve, such as shown in FIG. 1, for sequencing of seal retraction and valve operation to assure that the seal is fully retracted before the valve ball is rotated. FIG. 6 schematically represents such a system for use with a sphere-handling valve V of a meter proving system utilizing the retractable seal described heretofore. The system is a combination electrical and hydraulical system. The electrical components comprise a power source G, stop switch $S_1$, start switch $S_2$, operator limit switches $S_3$, $S_4$, detector switch $S_5$, relays $R_1$, $R_2$, timers $T_1$, $T_2$, valve operator 0, pump P and solenoid valve $S_o$, all connected through suitable circuitry. Relays $R_1$, $R_2$ and timers $T_1$, $T_2$ are commonly known in the art and are commercially available from a number of sources. The hydraulic components comprise hydraulic reservoir $R_s$, pump P, solenoid valve $S_o$, and retractable seals $S_e$ connected through suitable hydraulic lines 100, 101.

To operate the system, starting with a sphere in valve V in the receive position shown in FIG. 2(a), start switch $S_2$ is closed supplying power to relay $R_1$. Relay $R_1$ supplies power through switch $S_3$, which is closed when operator 0 is in its up position, to start pump P and energize solenoid valve $S_o$. At the same time timer $T_1$ is started. Solenoid valve $S_o$ blocks dump line 100 and pump P pumps fluid under pressure through line 101 to retractable seals $S_e$, disengaging the seals from the rotating ball of valve V. After an interval of time, i.e., 20 seconds, timer $T_1$ energizes operator 0 which rotates valve V 180° to the launch position shown in FIG. 2(c). As the operator begins to move downward it closes switch $S_4$ and at the bottom of its travel opens switch $S_3$. When switch $S_3$ opens, power to pump P and solenoid valve $S_o$ is interrupted. Pump P stops and solenoid valve $S_o$ opens allowing fluid in line 101 to dump through line 100 back into reservoir $R_s$. With pressure relieved, seals $S_e$ return to sealing engagement with the ball member of valve V.

With valve V in the launch position, the displacing sphere reenters the meter prover loop for another cycle. When it reaches the second sphere detector, such as 8 in FIG. 1, it closes detector switch $S_5$ which is an auxiliary switch connected to the sphere detector switch (8 in FIG. 1).

When detector switch $S_5$ is closed, power is supplied to relay $R_2$, starting timer $T_2$ and pump P and again closing solenoid valve $S_o$. Pressure is again applied to seals $S_e$ for retraction. Timer $T_2$ times out, energizing operator 0 for rotating valve V back to its receive position. As the operator begins to move upward it again closes switch $S_3$ and at its upper point of travel opens switch $S_4$. With switch $S_4$ opened pump P stops and solenoid valve $S_o$ opens to relieve seals $S_3$ of retracting pressure.

Seals $S_e$ then return to sealing engagement with the ball in valve V. At this point one cycle has been completed and the system is ready for successive cycles performed in the identical manner.

If it is necessary to remove or replace a sphere, stop switch $S_1$ can be opened when valve operator 0 has moved halfway through its downward stroke and the ball of valve V is in the load-unload position of FIG. 2(b). The opening of switch $S_1$ interrupts power to all electrical components, stops pump P and relieves pressure from seals $S_e$. Thus the seals reengage the ball member of valve V making it possible to open the valve closure and remove or replace the sphere displacer.

The forgoing description of a preferred embodiment of the invention has disclosed a unique seal arrangement for a valve whereby the seal may be retracted from sealing engagement with the closure member of the valve before movement of the closure member. Thus, seal wear is greatly reduced or eliminated, cutting of seats and closure member is eliminated, the seal is made self-flushing, and the torque required to move the closure member is greatly reduced. Furthermore, it has been shown that the seal may be easily programmed in an automatic operating system for efficient failsafe operation.

Various embodiments of the invention are shown in the drawing and described in the specification, but many variations thereof will be apparent to those skilled in the art. It is not practical to show or describe all the variations included within the invention, and therefore the embodiments described should be considered illustrative only, and not limiting, the scope of the invention being as broad as is defined by the appended claims. The form of the claims and the specification, including the Abstract, is adopted solely for easier reading and understanding, and should not be considered in interpreting the scope of the invention claimed.

I claim:

1. In a valve having a body with flow ports and a member positionable within said body to direct or block flow through said body, sealing apparatus for sealing between said body and said positionable member comprising, sealing means mounted in at least one of said flow ports in sealing contact with said positionable member comprising a longitudinally sliding sleeve seat member having an annular extending lip member at one end thereof and a resilient seal ring at the opposite end thereof, no external diameter of said sleeve member between said lip member and said seal ring being greater than the diameter of said annular lip or less than the sealing diameter of said seal ring an isolated annular pressure chamber being at least partially defined by the exterior of said sleeve member, one side of said lip member and the bore of said flow port, the opposite side of said lip member being subjected to the pressure in said valve port within which said seat member is mounted, and remotely operable means hydraulically connected to said isolated chamber for retracting said sealing means within said port from engagement with said positionable member without moving said positionable member.

2. The sealing apparatus of claim 1 in which said sealing means comprises resilient means biasing said seat member toward said positionable member.

3. In a valve having a body with flow ports and a member within said body positionable to direct or block flow through said body, sealing apparatus for sealing between said body and said positionable member comprising, a sleevelike seat member mounted in at least one of said flow ports for limited longitudinal movement therein and having an annular extension thereon the diameter of which is greater than the remaining exterior of said seat member, an annular sealing member mounted on said seat member confronting said positionable member in sealing contact therewith, the sealing diameter of said sealing member being less than any exterior diameter of said seat member, resilient means between said seat member and said body urging said sealing member into said sealing contact, pressure chamber means at least partially defined by said body, one annular surface of said annular extension and the exterior of said seat member, annular seals surrounding said exterior and larger diameter annular extension providing sliding seals between said exterior and annular extension and cooperating cylindrical surfaces adjacent thereto, and conduit means providing pressure communication between said chamber means and an external pressure source whereby pressure may be selectively introduced to said chamber to retract said sealing member from said sealing contact with said positionable member.

4. The sealing apparatus of claim 3 in which said seating member has opposed annular surfaces, one subjected to the pressure in said chamber means and another subjected to the pressure in said port.

5. The sealing apparatus of claim 3 in which said positionable member has a ball-shaped exterior and a generally cylindrical passageway into its interior, said passageway and said ball-shaped exterior being joined by an annular rounded lip, said sealing member having a plurality of annular rounded surfaces confluently joined and confronting said lip in sealing engagement therewith.

6. Automatically operable apparatus for use with a valve having a movable flow control member therein and operator means for moving said flow control member, said apparatus comprising;

hydraulically retractable seal means in sealing contact with said flow control member;

pressure producing means hydraulically connected to said seal means; and power apparatus connected to said pressure producing means, said power apparatus being adapted, on a signal, to start said pressure producing means for retracting said seal means, then after predetermined movement of said flow control member to stop said pressure producing means to allow said seal means to reengage said flow control member, characterized in that said power apparatus includes a switch associated with said flow control member so that, after movement of said control member, said switch is caused to interrupt power supplied to said pressure producing means to allow said reengagement of said seal means.

7. Automatically operable apparatus for use with a valve having a movable flow control member therein and operator means for moving said flow control member, said apparatus comprising;

hydraulically retractable seal means in sealing contact with said flow control member;

pressure producing means hydraulically connected to said seal means; and power apparatus connected to said pressure producing means, said power apparatus being adapted, on a signal, to start said pressure producing means for retracting said seal means, then after predetermined movement of said flow control member to stop said pressure producing means to allow said seal means to reengage said flow control member, characterized in that said power apparatus comprises timer means which is adapted to prevent movement of said flow control means until said seal means has been retracted from said flow control member.

8. Automatically operable apparatus for use with a valve having a movable flow control member therein and operator means for moving said flow control member, said apparatus comprising;

hydraulically retractable seal means in sealing contact with said flow control member;

pressure producing means hydraulically connected to said seal means; and electrical apparatus connected to said pressure producing means and said operator means, said electrical apparatus being adapted, on a signal, to i. start said pressure producing means for retracting said seal means, ii. after a time delay, energize said operator means for moving said flow control member, and iii. after movement of said flow control member, stop said pressure producing means to allow said seal means to reengage said flow control member.

9. A meter prover having a sphere transfer valve therein, said valve comprising:

a body with ports, at least one of said ports opening to the atmosphere and the other ports being in areas of substantially equal pressure;

a closure member within said body movable to positions of either blocking or allowing flow through said ports, sealing means surrounding at least one of said other ports for sealingly engaging said body and said closure member in both said flow blocking or allowing positions under conditions of no pressure differential across said valve and under conditions of substantial pressure differential across said valve, said sealing means comprising an intermediate cylindrical sleeve portion with an annular head portion at one end and a resilient seal portion at the opposite end, the diameter of said intermediate portion being less than the diameter of said head portion but no less than the sealing diameter of said seal portion, said portions presenting lateral areas substantially perpendicular to the axis of the port which it surrounds, and means for moving the sealing means out of sealing engagement with said closure member without changing the relative positions of said body and said closure member.

10. The meter prover of claim 9 in which the lateral area of said sealing means exposed to the pressure in said port is greater facing away from said closure member than the lateral area so exposed and facing toward said closure member when said sealing means is in the nonengaging position biasing said sealing member toward said closure member.

11. The meter prover of claim 10 in which said biasing is further aided by resilient means disposed in said valve.

12. In a valve having a body with ports and a movable flow control member therein, sealing means for sealing engagement with said body and said flow control member comprising: a sleevelike seat member mounted for sliding longitudinal movement in at least one of said ports and having an annular seal ring at one end thereof confronting said flow control member for sealing engagement therewith. A larger diameter annular head portion at the opposite end thereof and an intermediate portion of a smaller diameter, a removable annular body ring sealingly attached to said body, said intermediate and head portions of said seat member being in sliding sealing contact with said port and said body ring, respectively, forming a variable volume annular pressure chamber at least partially defined by an annular surface on said body ring, a first annular surface on said head portion, the wall of said port and the exterior of said intermediate portion, and means for introducing an external pressure source to said pressure chamber for retracting said seat member from sealing engagement with said flow control member.

13. The valve of claim 12 characterized in that the head end of said seat member is exposed to the pressure within said valve port, the lateral area exposed to said port pressure at said head end being greater than the opposing lateral areas exposed to said port pressure at the seal end of said seat member when said seat member is retracted.

14. The valve of claim 13 characterized by resilient means adjacent said seat member head end biasing said seat member toward sealing engagement with said flow control member.